Dec. 1, 1942.   P. C. VAN DER WILLIGEN ET AL   2,303,774
METHOD OF MAKING A STRATIFIED ELECTRODE SYSTEM
Filed Feb. 3, 1939
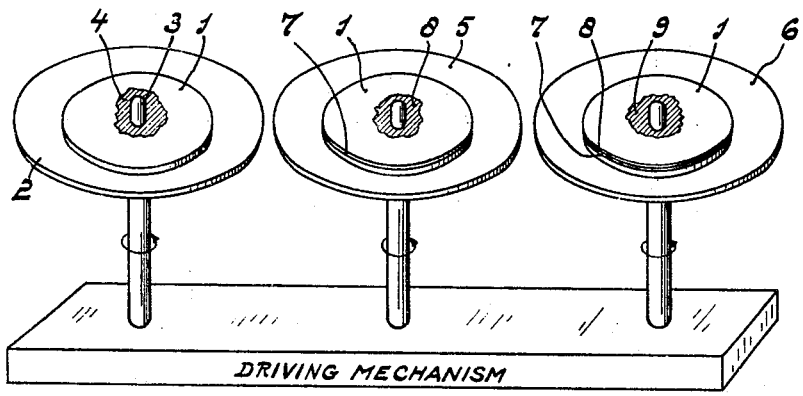
INVENTORS
PAUL CHRISTIAAN VAN DER WILLIGEN
and CHARLES LOUIS BOUCHER
BY Lee B. Kenon
ATTORNEY.

Patented Dec. 1, 1942

2,303,774

UNITED STATES PATENT OFFICE 2,303,774

METHOD OF MAKING A STRATIFIED ELECTRODE SYSTEM

Paul Christiaan van der Willigen and Charles Louis Boucher, Eindhoven, Netherlands, assignors, by mesne assignments, to Hartford National Bank and Trust Company, Hartford, Conn., as trustee Application February 3, 1939, Serial No. 254,508
In Germany February 4, 1938

8 Claims. (Cl. 175—366)

This invention relates to manufacture of stratified electrode systems, and more particularly to a method of forming the layers of such systems.

In electrode systems of this type, which are well known in the art inter alia as photo-electric cells and as blocking layer rectifiers, it is essential that the layers be very compact, coherent, and should firmly adhere to the substratum or carrier. It has been suggested that instead of previously forming the material of these layers into plates, it would be preferable to form the same in situ on a substratum by applying the material in a liquid state or from a suspension, and in practice the material is usually sprayed on a substratum to form the layer.

Depending mainly on the nature of the material being applied, the above methods may be carried out with more or less success, but we have found that when using such methods in mass production it is very difficult to obtain uniform, coherent and readily-adhering layers in an inexpensive manner and without wasting a considerable amount of the material. For example, in the spraying process the carrier and the spray nozzle from which the material is sprayed in a finely-divided state upon the carrier, are moved relative to each other so that the entire surface to be coated is provided with a layer. However, as the spray is not uniform it is very difficult to obtain a layer of uniform thickness. In addition, there is a considerable loss of material, particularly when spraying at the edges of the carrier. Furthermore, the materials being applied may be subjected to chemical transformation in the air due to the finely-divided condition in which they move through the air to the carrier, and gases may be occluded in the layer.

The main object of our invention is to overcome the above difficulties and to provide a method which improves the quality of the layer produced.

A further object is to provide a method by which it is possible to apply in a satisfactory manner even those materials, such as selenium, which could be applied only with the greatest difficulty by prior art methods.

A further object is to prevent the waste of material.

A still further object is to provide a method by which very thin layers of uniform thickness may be formed.

Further objects and advantages of the invention will appear as the description progresses.

In accordance with the invention, we apply to a portion of the surface of the carrier upon which the layer is to be formed a quantity of the material from which the layer is to be formed, which is in such form as regards its viscosity that it may be readily distributed over the surface, and uniformly distribute the material over this surface by rapidly moving the carrier, for instance by rotating or shuffling the same.

Another advantageous motion for uniformly distributing the material is one in which the carrier is given a composite reciprocating motion in a horizontal plane. More particularly, the carrier is reciprocated in one direction at a given frequency, and at the same time reciprocated in a direction normal to the first direction and at a frequency different from that of the first frequency.

The method of the invention makes it possible to apply a measured quantity of material of such low viscosity that a very coherent layer which firmly adheres to the substratum can be readily obtained, and the distribution over the surface by rapid movements of the carrier may be effected in such manner that practically none of the material is lost. Thus, in contradistinction to the prior methods, it is possible to apply such a predetermined quantity of the material that a layer of exactly the required thickness is obtained. In addition, the method makes it possible to produce a large number of the layers with uniform results, and to apply very thin layers which could be obtained in mass production only with great difficulty by prior methods.

In one embodiment of the invention we first apply to the carrier only a part of the total amount of the material in a liquid state, and then distribute this material over the surface by rapidly moving the carrier, the viscosity of the material being such that a coherent and readily-adhering layer is obtained. The remaining part of the amount of the material to be applied is then applied in a state of higher viscosity than the first-mentioned amount and is distributed over the surface by rapid movements of the carrier.

If, in the case of thicker layers, all the material were to be applied to the carrier at the same time and were to be distributed, for example, by rotation of the latter, there would be the danger that the material, if it were of very low viscosity, would be flung off the surface and thus become lost, or if it were of comparatively high viscosity it would not firmly adhere to the carrier. These difficulties are eliminated by the method of the above embodiment because it is possible to apply first a thin layer of low viscosity material, which can penetrate into all unevennesses of the carrier and thus quite readily adhere in situ without the disk of gas occlusions, and then apply the remaining part of the material of such viscosity that satisfactory spreading, and consequently an even layer, is obtained. There is no danger that the second quantity will not adhere properly on the first applied layer, because the materials are the same and in most cases the material of the first layer has not yet become quite solid when the second layer is applied. The amounts applied in succession can of course be predetermined accurately.

The term "remaining part" is not to be construed as meaning that the first-applied amount is larger than the amount subsequently applied. On the contrary, in most cases the order will be reversed.

Many materials, and particularly selenium, can be brought into the desired liquid state merely by melting the same. Therefore, when applying such materials in various amounts and in a plurality of steps, the viscosity of the material can be adjusted in a simple manner by changing the temperature of the molten material. This temperature in turn is preferably adjusted to the correct value by heating the carrier to the desired temperature. For example, in the case of selenium, we have found that excellent results are obtained by heating the first-applied quantity of the material to a temperature of at least about 300° C., and heating the subsequently-applied amount to a temperature of about 150° C.

Materials which present difficulties in melting can be placed in the desired liquid state by placing them in solution or suspension. A suspension may be used with advantage, for example, for applying a carbon layer, whereas an example of a material brought into solution is polystyrene dissolved in benzene.

From the above it is clear that heating the carrier to an elevated temperature may be important not only for giving the molten substances the proper temperatures, but also for volatilizing the solvent or the suspension medium.

In order that the invention may be clearly understood and readily carried into effect, we shall describe the same in more detail by means of several specific examples and with reference to the accompanying drawing which illustrates diagrammatically an apparatus for use in carrying out the invention.

The embodiment to be described relates to the method for manufacturing a blocking layer rectifier, i. e., an electrode system of asymmetric conductivity, the electrode having the lower emission (semi-conductor) being made of selenium. However, a considerable portion of the method may also be used for the manufacture of other electrode systems.

As shown in the drawing, the first carrier is in the form of a small aluminium disc 1 having at one side a surface area of about 16 sq. cms., and is placed upon a horizontal circular plate 2 provided with a central stud 3 which passes through a hole in disc 1 to retain the disc in place. Plate 2 is adapted to be rotated, as indicated by the arrow, by suitable driving means, and to be maintained at certain temperatures by suitable heating means (not shown).

To the central portion of disc 1, we apply, for instance from a pipette, a quantity of carbon suspended in water, as indicated by reference numeral 4. The rotary plate 2 is given a temperature of about 15 to 20° C., and is rotated at a speed of about 1300 R. P. M. At the same time that the quantity of carbon suspension is applied, the driving means are removed the rotation speed of the plate 2 with the disc 1 diminishing so that the disc finally stops. In this period of decreasing speed the carbon spreads out over the entire surface in satisfactory sense. Owing to this rotary movement the suspension 4 is distributed over the entire upper surface of disc 1 in a layer of uniform thickness. If desired a thin carbon layer may first be applied in the above manner, and after the suspension medium is largely volatilized, a second thin carbon layer may be applied in a similar manner. The resulting body is then dried, which is preferably effected by continuing the rotation, and if necessary with the use of auxiliary drying means, such as a stream of heated air or subsequently drying (for example in a furnace at about 500° C.).

The disc 1 provided with the dried carbon layer thereon is then mounted on a second plate 5 which is provided with heating means (not shown) so that the surface to be coated is given a temperature of about 400° C. In the present example disc 1 has on one side a surface area of about 16 sq. cms. and about 0.1 to 0.2 gram of molten selenium at a temperature of about 300° C. is then applied at 8. The disc 5 is then rotated at a speed of about 1800 R. P. M., with the result that the selenium is distributed over the surface of the layer 7 to form a layer of uniform thickness which readily adheres to the carbon layer. Disc 1 is then cooled to a temperature of about 150° C., which may be effected advantageously by mounting it on a third plate 6 having this temperature. An additional quantity of 0.6 gram of selenium is then applied at 9 and is distributed over the surface of layer 8 by the rotation of plate 6.

As an alternative, the two applications of selenium at temperatures of 300° and 150° C. may be combined in such manner that the disc 1 with the carbon layer thereon is heated to about 300° C. and is then mounted on the centrifugal plate 5. In this case all of the required amount of selenium, heated to 275° C., may even be applied at the same time, because part of this selenium will expand about the surface during centrifuging, the temperature of the disc falling off gradually from 300°.

The disc 1 with the selenium and carbon layers thereon is then subjected to the process of manufacture in which a blocking layer and a second layer of good conducting material are applied thereto. The application of the material of these layers may be effected by the method according to the invention, but further description of this process of manufacture is not believed necessary for an understanding of the invention.

In the above example the resulting layer of selenium had a thickness of about 100 microns, for which purpose the total amount of selenium applied was about 0.8 gram. However, the method described permits of applying layers as thin as those obtained according to the prior art with a considerable less amount of material.

We are aware of the fact that it has been proposed to apply a quantity of a material, such as selenium in a liquid state to a carrier, by painting the same on the surface with a brush. Such a method, however, has the disadvantages that the material should be rather viscous in order that good brushing could be insured, and that it is always necessary to provide a plentiful supply which becomes lost. In addition, the method is round about, and there is the difficulty that the brushing instrument has always to be cleaned again. To produce the above-described selenium layer of a thickness of about 100 microns by the brushing method, we have found that it was necessary to use about 4 grams of selenium. In comparison with this, with the method of the present invention only about 0.8 gram by weight was found to be sufficient, and because of the excellent quality of the layer of selenium obtained by our method, we have found that it is even possible to reduce this amount in accordance with the use to which the electrode system is to be put.

If, during the mounting of selenium by the present method, it is desired that the selenium crystallize in the conductive form, care must be taken that in view of the crystallization speed of selenium, the time for this purpose is made sufficiently long. With reference to the above example, this crystallization ensues during the treatment on the rotary plate 6 at 150° C. Since at this temperature crystallization ensues too slowly for rapid manufacturing, it is in this case desirable that the temperature of the plate 6 should be raised by about 15 to 25°, i. e., to about 165 to 175° C., so that the crystallization process can come to an end in a few minutes. In this case it may not be necessary to maintain the rotary movement during this process, since only the temperature of the disc is decisive in the crystallization. In the methods hitherto known this process was carried out with the use of a feed pressure, but when the selenium is being applied by the present method a high density is already obtained owing to the centrifugal forces, and such feed pressures become unnecessary.

If, however, it is desired that crystallization does not occur to any great extent during the application of the selenium layer, this is rendered possible by the present method by applying the layer very rapidly with a suitable speed of rotation and a correct choice of temperature.

While we have described our invention in connection with specific examples and with reference to certain materials, we do not wish to be limited thereto but desire the appended claims to be construed as broadly as is permissible in view of the prior art.

What we claim is:

1. In the manufacture of a stratified electrode system, a method of forming a layer on a substratum, comprising the steps of applying to a part of the surface of the substratum a portion of the material to be applied in a liquid form of low viscosity, rapidly moving the substratum to distribute the material in a layer extending over the surface, applying to a part of the surface of the so-formed layer the remaining part of the material in a liquid form of a higher viscosity than the first-applied material, and rapidly moving the substratum to distribute the last-applied material over the surface of the layer.

2. In the manufacture of a stratified electrode system, a method of forming a layer on a substratum, comprising the steps of applying to a part of the surface of the substratum a portion of the material to be applied in a form in which it can be readily distributed, rapidly moving the substratum while heating the material to form a layer over the surface, applying the remaining portion of the material to a part of the surface of said layer, and rapidly moving the substratum while heating the last-applied material to a temperature lower than that to which the first-applied material was heated to thereby distribute the same over the surface of the layer.

3. In the manufacture of a stratified electrode system, a method of forming a layer on a substratum comprising the steps of applying a quantity of selenium to a part of the surface of the substratum, rapidly moving the substratum while maintaining the selenium at a temperature of at least 300° C. to distribute the selenium in a layer over the surface, applying to a part of the layer a quantity of selenium sufficient to produce a layer of predetermined thickness, and rapidly moving the substratum while maintaining the last-applied selenium at a temperature of about 150° C. to distribute the last-applied selenium over the surface of the layer.

4. In the manufacture of a blocking-layer rectifier having a semi-conducting electrode of selenium, the steps of applying to part of the surface of a metal carrier a liquid containing carbon in suspension, rapidly moving the carrier to distribute the liquid in a thin layer over the surface, volatilizing the liquid to form a carbon layer, applying a quantity of selenium in its molten state to a part of the surface of the carbon layer, and rapidly moving the carrier to distribute the molten selenium over the surface of the carbon layer.

5. In the manufacture of a stratified electrode system, a method of forming a layer on a substratum, comprising the steps of applying to a part of the substratum a portion of the material to be applied in a liquid form of low viscosity, rotating the substratum to centrifugally distribute the material in a layer extending over the surface of the substratum, applying to a part of the surface of the so-formed layer the remaining part of the material in a liquid form of a higher viscosity than the first-applied material, and rotating the substratum to centrifugally distribute the last-applied material over the surface of the layer.

6. In the manufacture of a stratified electrode system, a method of forming a layer on a substratum, comprising the steps of applying to a part of the surface of the substratum a portion of the material to be applied in a form in which it can be readily distributed, rotating the substratum while heating the material to centrifugally distribute the material and form a layer over the surface, applying the remaining portion of the material to a part of the surface of said layer, and rotating the substratum while heating the last applied material to a temperature lower than that to which the first material was heated to thereby centrifugally distribute the last-applied material over the surface of the layer.

7. In the manufacture of a stratified electrode system, a method of forming a layer on a substratum, comprising the steps of applying a quantity of selenium to a part of the surface of the substratum, rotating the substratum while maintaining the selenium at a temperature of at least 300° C. to centrifugally distribute the selenium in a layer over the surface, applying to a part of the layer a quantity of selenium sufficient to produce a layer of predetermined thickness, and rotating the substratum while maintaining the last-applied selenium at a temeprature of about 150° C. to centrifugally distribute the last-applied selenium over the surface of the layer.

8. In the manufacture of a blocking-layer rectifier having a semi-conducting electrode of selenium, the steps of applying to part of the surface of a metal carrier a liquid containing carbon in suspension, rotating the carrier to centrifugally distribute the liquid in a thin layer over the surface, volatilizing the liquid to form a carbon layer, applying a quantity of selenium in its molten state to a part of the surface of the carbon layer, and rotating the carrier to centrifugally distribute the molten selenium over the surface of the carbon layer.

PAUL CHRISTIAAN VAN DER WILLIGEN.
CHARLES LOUIS BOUCHER.